(12) United States Patent
Jang

(10) Patent No.: US 10,785,477 B2
(45) Date of Patent: *Sep. 22, 2020

(54) METHOD FOR PROCESSING VIDEO ON BASIS OF INTER PREDICTION MODE AND APPARATUS THEREFOR

(71) Applicant: LG ELECTRONICS INC., Seoul (KR)

(72) Inventor: Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/339,932

(22) PCT Filed: Sep. 29, 2017

(86) PCT No.: PCT/KR2017/010964
§ 371 (c)(1),
(2) Date: Apr. 5, 2019

(87) PCT Pub. No.: WO2018/066927
PCT Pub. Date: Apr. 12, 2018

(65) Prior Publication Data
US 2020/0045307 A1 Feb. 6, 2020

Related U.S. Application Data

(60) Provisional application No. 62/404,774, filed on Oct. 6, 2016.

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/119* (2014.11); *H04N 19/176* (2014.11); *H04N 19/513* (2014.11); *H04N 19/70* (2014.11)

(58) Field of Classification Search
None
See application file for complete search history.

(56) References Cited

U.S. PATENT DOCUMENTS 10,397,580 B2 * 8/2019 Park ...................... H04N 19/159
10,419,779 B2 * 9/2019 Yoo ...................... H04N 19/176
(Continued)

FOREIGN PATENT DOCUMENTS

EP 2779649 A1 9/2014
JP 2011-091696 A 5/2011
(Continued)

OTHER PUBLICATIONS

Chen, et al. JVET-C1001_v3—International Organization for Standarization Organisation Internationale De Normilisation ISO/IEC JTC 1/SC 29/ WG 11 Coding of Moving Pictures and Audio, Geneva, CH Jun. 2016 Algorithm description of Joint Exploration Test Model 3 (JEM3) Video/ JVET/ (37 Pages).
(Continued)

*Primary Examiner* — Reza Aghevli
(74) *Attorney, Agent, or Firm* — Dentons US LLP

(57) ABSTRACT

The present invention discloses an inter prediction mode-based image processing method and a device for the method. More specifically, the inter prediction mode-based image processing method comprises deriving backward motion information of a current block by using motion information of a block within a reference picture of a current picture; adding the backward motion information to a motion information candidate list of the current block; deriving motion information of the current block from motion information
(Continued)

selected from motion information candidate added to the motion information candidate list; and generating a prediction block of the current block by using motion information of the current block, wherein a block within the reference picture is specified by the backward motion information.

11 Claims, 24 Drawing Sheets

(51) Int. Cl.
*H04N 19/176* (2014.01)
*H04N 19/513* (2014.01)
*H04N 19/70* (2014.01)

(56) References Cited

U.S. PATENT DOCUMENTS

| | | | | |
|---|---|---|---|---|
| 2014/0254682 | A1* | 9/2014 | Chen | H04N 19/597 |
| | | | | 375/240.16 |
| 2014/0355685 | A1* | 12/2014 | Chen | H04N 19/52 |
| | | | | 375/240.16 |
| 2015/0003529 | A1* | 1/2015 | Thirumalai | H04N 19/597 |
| | | | | 375/240.14 |
| 2015/0163494 | A1* | 6/2015 | Park | H04N 19/96 |
| | | | | 375/240.02 |
| 2016/0337665 | A1* | 11/2016 | Yoo | H04N 19/172 |
| 2017/0188028 | A1* | 6/2017 | Park | H04N 19/188 |
| 2018/0098087 | A1* | 4/2018 | Li | H04N 19/139 |
| 2019/0158829 | A1* | 5/2019 | Ohkawa | H04N 19/159 |
| 2019/0191156 | A1* | 6/2019 | Yoo | H04N 19/124 |

FOREIGN PATENT DOCUMENTS

| | | | | |
|---|---|---|---|---|
| JP | 2014-533059 | A | 12/2014 | |
| KR | 10-2013-0084314 | A | 7/2013 | |
| KR | 10-2014-0043844 | A | 4/2014 | |
| KR | 10-2014-0064944 | A | 5/2014 | |
| KR | 10-2014-0077919 | A | 6/2014 | |
| KR | 10-2016-0022345 | A | 2/2016 | |
| WO | WO-2012059577 | A1 * | 5/2012 | H04N 19/70 |
| WO | WO-2014204811 | A1 * | 12/2014 | H04N 19/80 |

OTHER PUBLICATIONS

Chien and Karzcewicz, XP030003891: ITU—Telecommunications Standarization Sector Study Group 16 Question 6 Video Coding Experts Group (VCEG) 52nd Meeting Jun. 19-26, 2015, Warsaw, Poland, Qualcomm Incorporated, Extension of Advanced Temporal Motion Vector Predictor (ATMVP) (4 Pages).

Chien, Chen and Lee, XP030150065: Joint Video Exploration Team (JVET) of ITU-T SG 16 WP 3 and ISO/IEC JTC 1 SC 29 /WG 11 2nd Meeting: San Diego, USA, Feb. 20-26, 2016, "Modification of merge candidate derivation," Qualcomm Incorporated (5 pages).

Chen, XP030150223: Joint Video Exploration Team (JVET) of ITU-T SG 16 WP 3 and ISO/IEC JTC 1/SC 29 WG 11, 3rd Meeting: Geneva, CH, May 26-Jun. 1, 2016, "Algorithm Description of Joint Exploration Test Model 3" Qualcomm Inc. (35 Pages).

* cited by examiner

[Fig. 1]
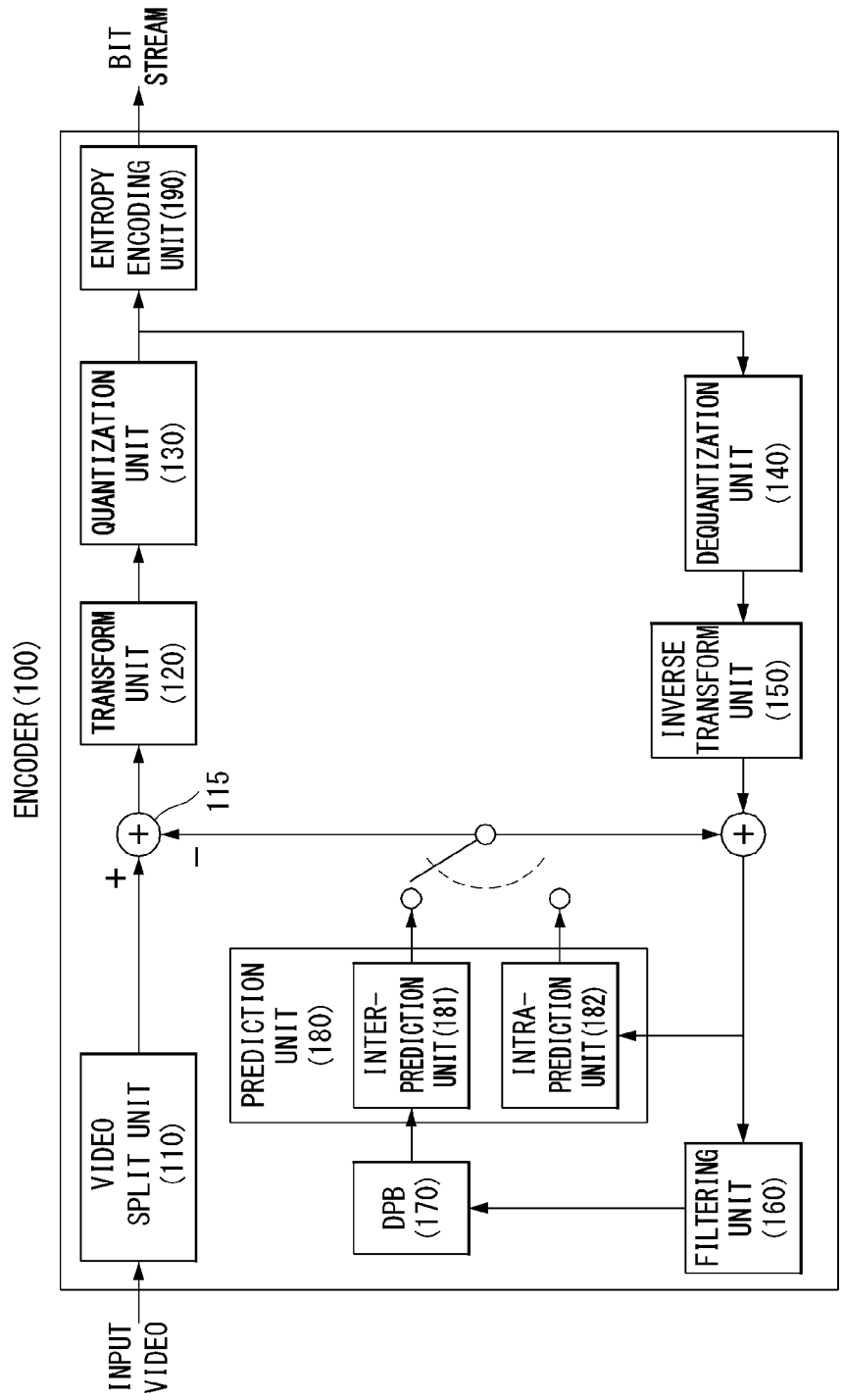

[Fig. 2]
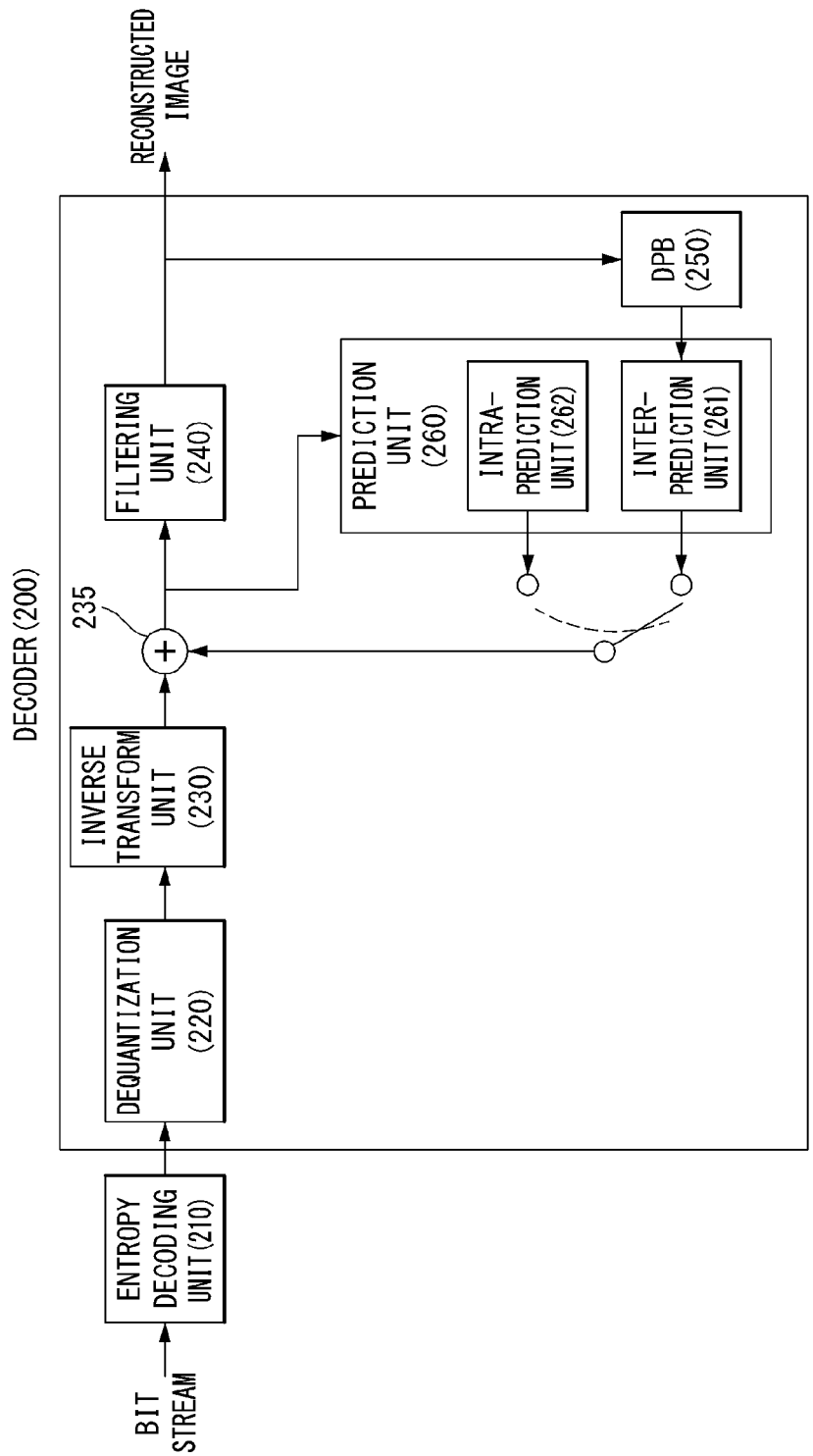

[Fig. 3]
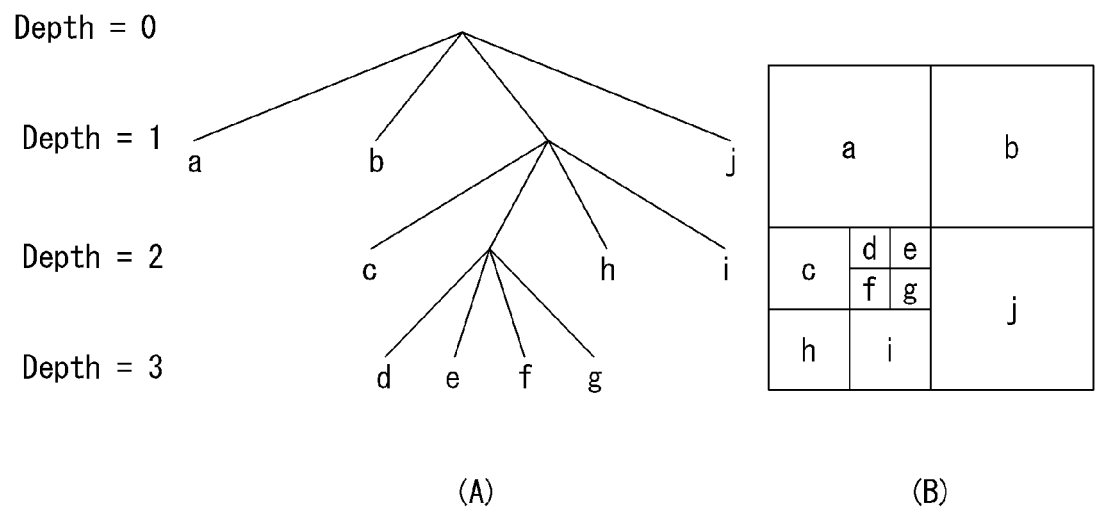

[Fig. 4]
Intra:
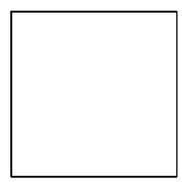 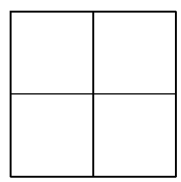
2Nx2N      NxN
Inter:
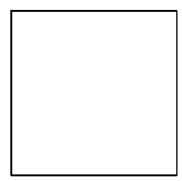 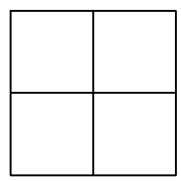 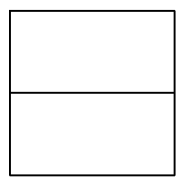 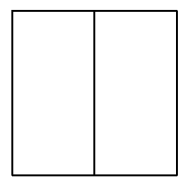
2Nx2N      NxN       2NxN      Nx2N
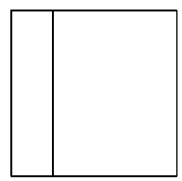 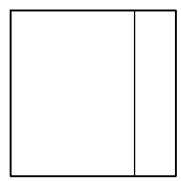 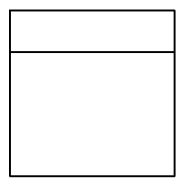 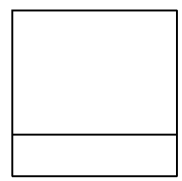
nLx2N     nRx2N     2NxnU     2NxnD

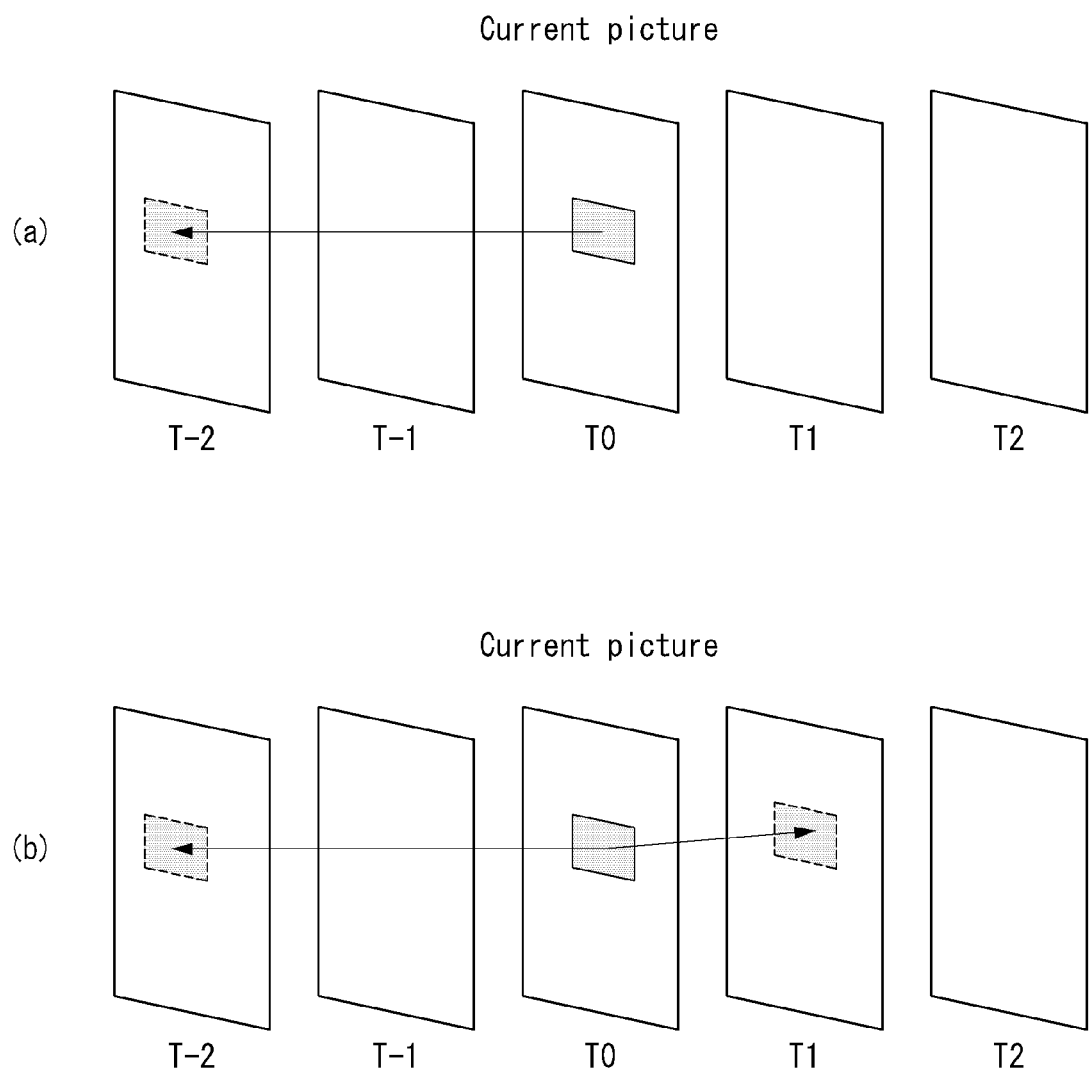

[Fig. 6]

| A<br>-1,-1 | | | | A<br>0,-1 | a<br>0,-1 | b<br>0,-1 | c<br>0,-1 | A<br>1,-1 | | | | A<br>2,-1 |
|---|---|---|---|---|---|---|---|---|---|---|---|---|
| | | | | | | | | | | | | |
| | | | | | | | | | | | | |
| | | | | | | | | | | | | |
| A<br>-1,0 | | | | A<br>0,0 | a<br>0,0 | b<br>0,0 | c<br>0,0 | A<br>1,0 | | | | A<br>2,0 |
| d<br>-1,0 | | | | d<br>0,0 | e<br>0,0 | f<br>0,0 | g<br>0,0 | d<br>1,0 | | | | d<br>2,0 |
| h<br>-1,0 | | | | h<br>0,0 | i<br>0,0 | j<br>0,0 | k<br>0,0 | h<br>1,0 | | | | h<br>2,0 |
| n<br>-1,0 | | | | n<br>0,0 | p<br>0,0 | q<br>0,0 | r<br>0,0 | n<br>1,0 | | | | n<br>2,0 |
| A<br>-1,1 | | | | A<br>0,1 | a<br>0,1 | b<br>0,1 | c<br>0,1 | A<br>1,1 | | | | A<br>2,1 |
| | | | | | | | | | | | | |
| | | | | | | | | | | | | |
| | | | | | | | | | | | | |
| A<br>-1,2 | | | | A<br>0,2 | a<br>0,2 | b<br>0,2 | c<br>0,2 | A<br>1,2 | | | | A<br>2,2 |

【Fig. 7】
(a)
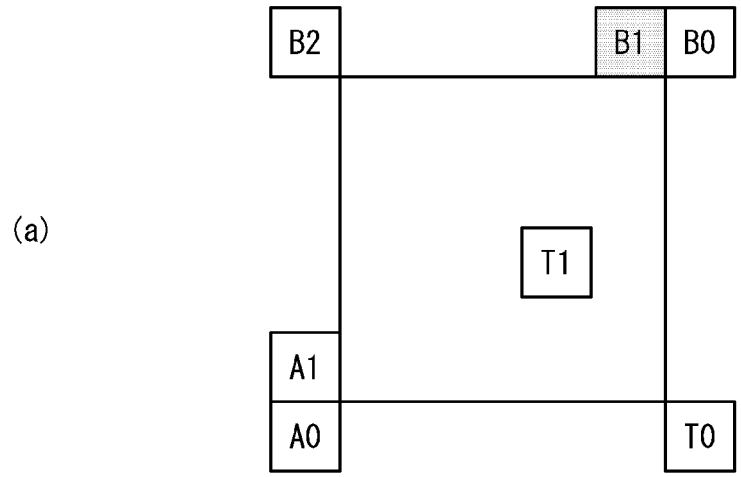
(b)
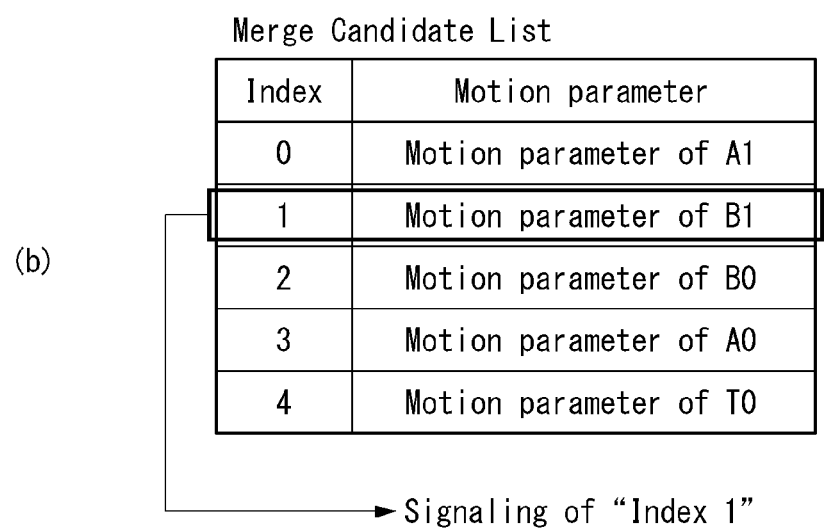

[Fig. 8]
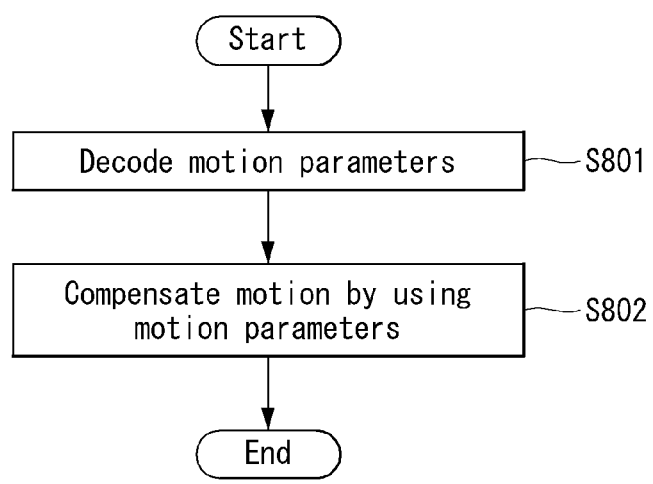

[Fig. 9]
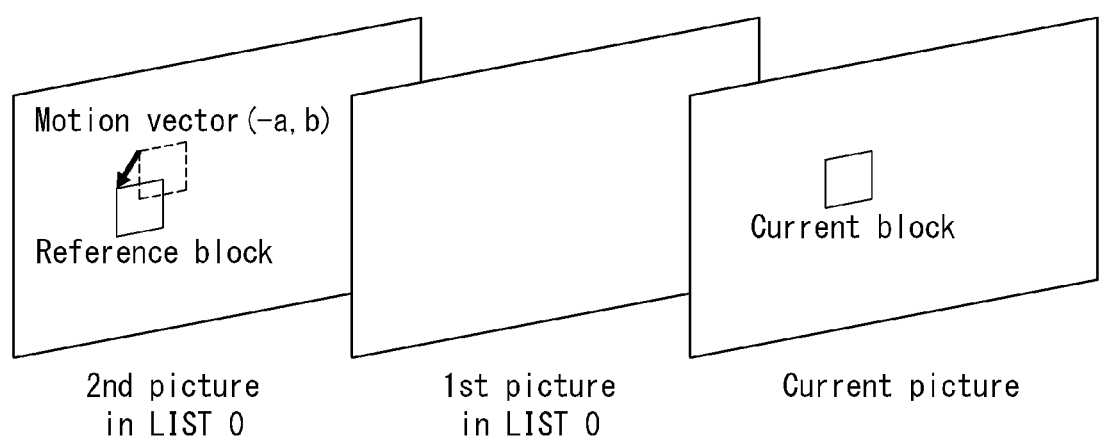

[Fig. 10]
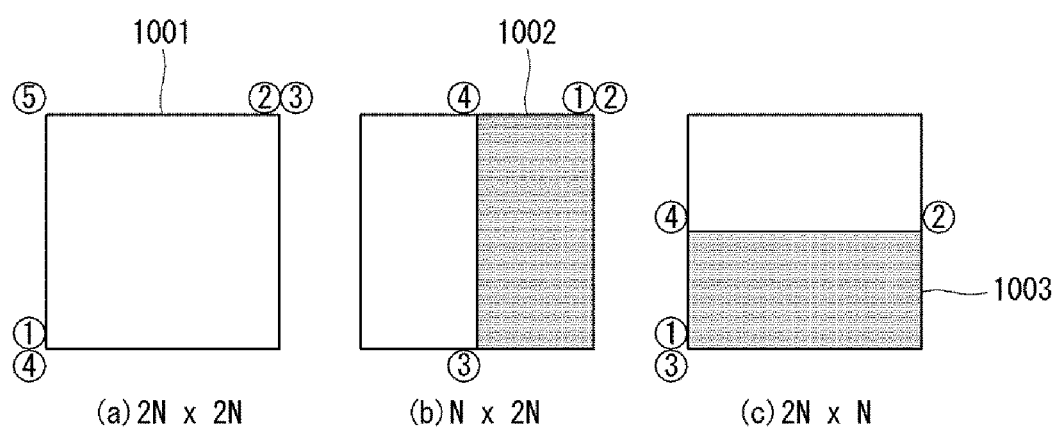

[Fig. 11]
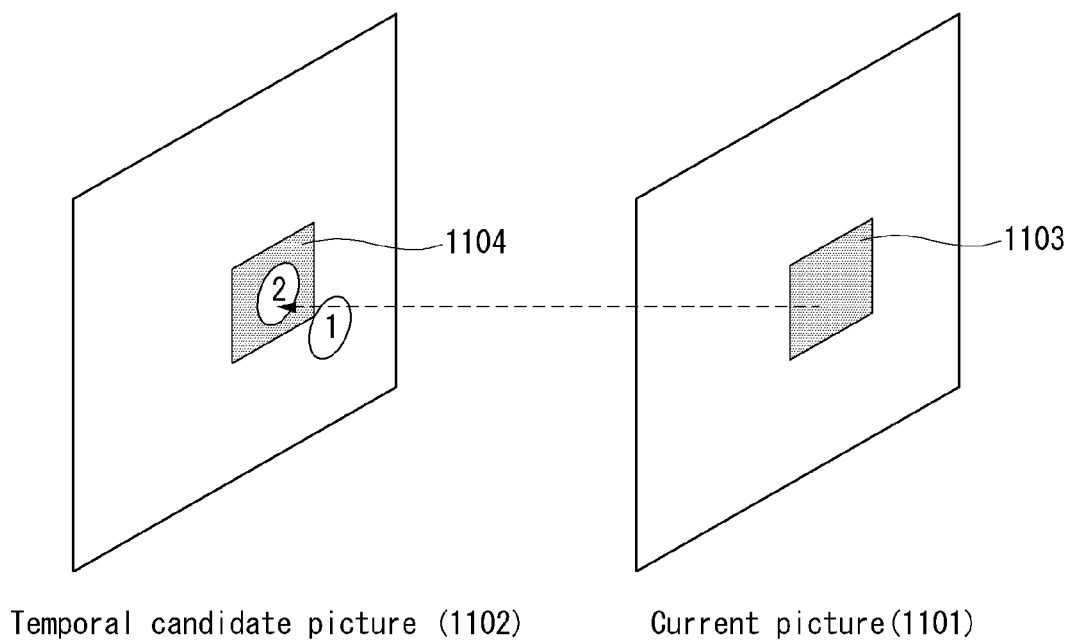
Temporal candidate picture (1102)  Current picture (1101)

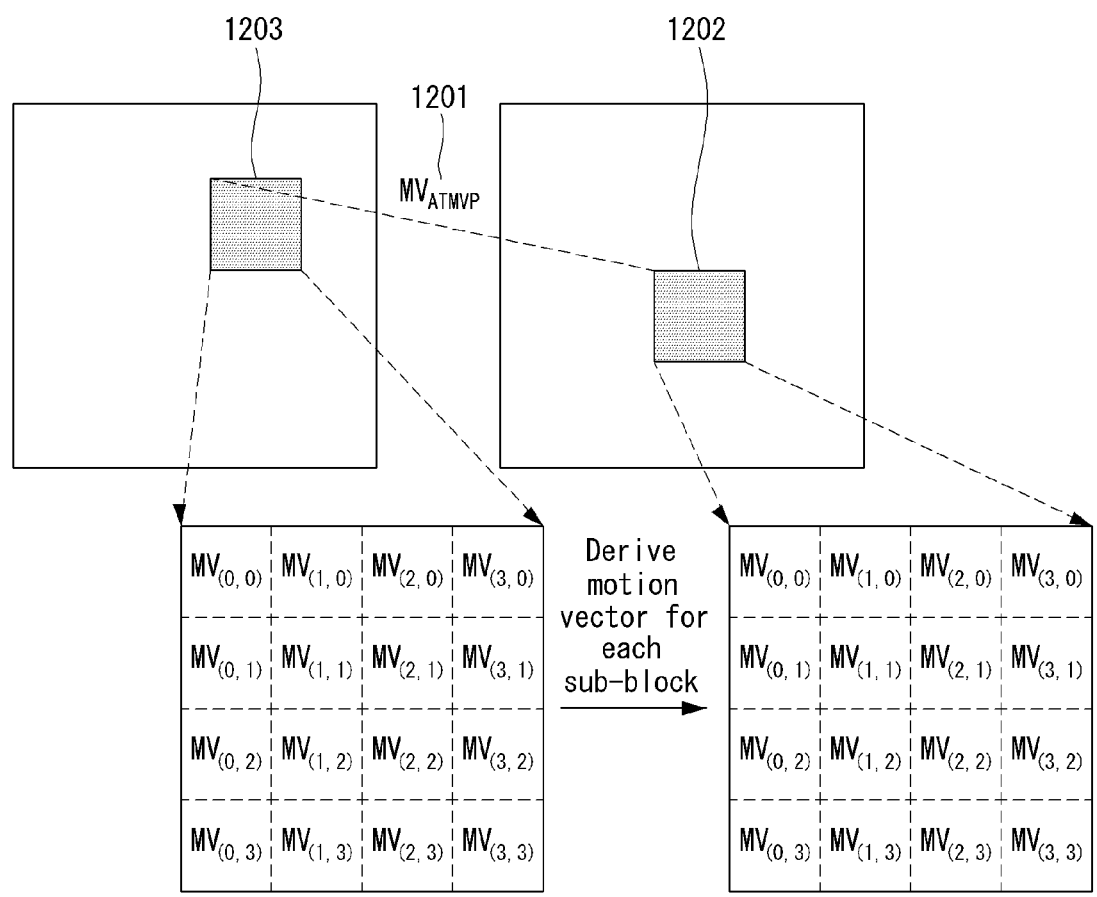
[Fig. 12]

【Fig. 13】
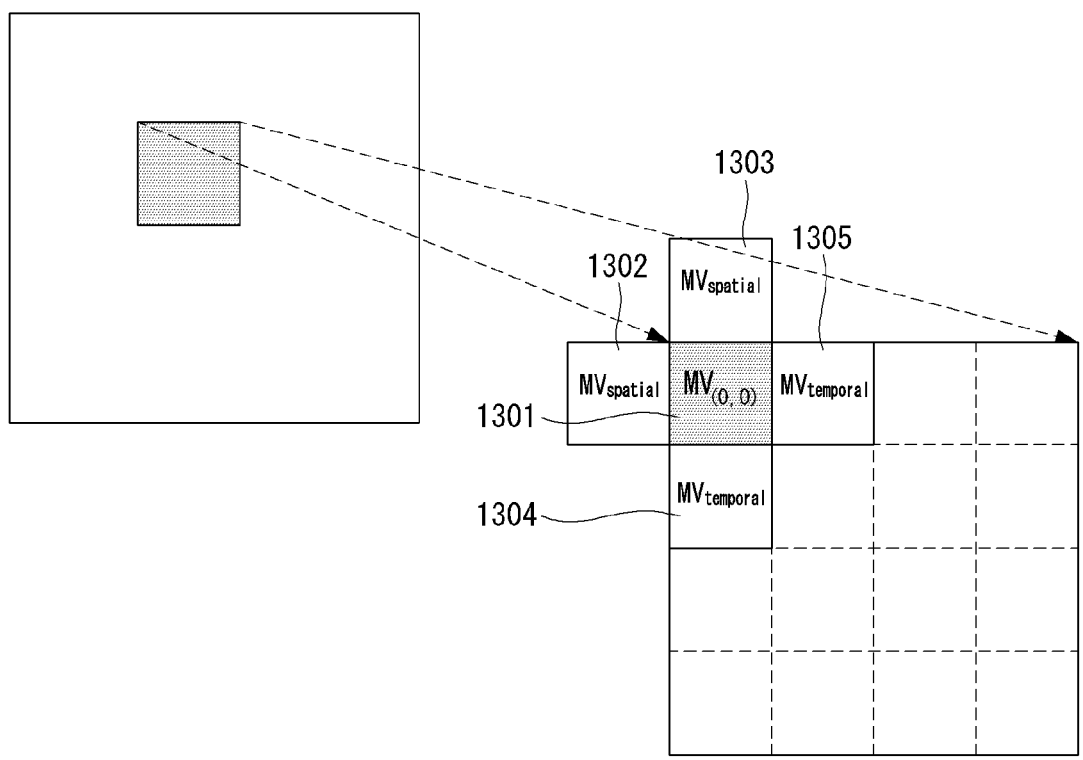

[Fig. 14]
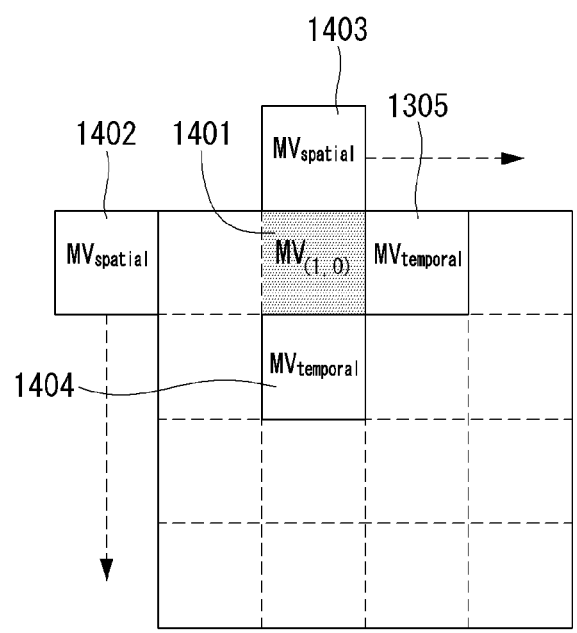

[Fig. 15]
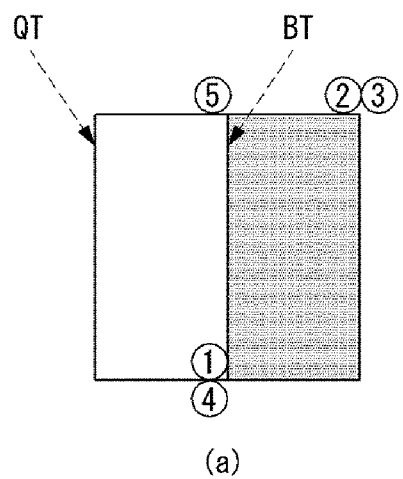
(a)
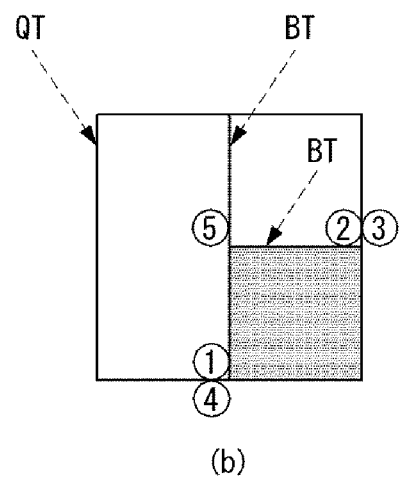
(b)

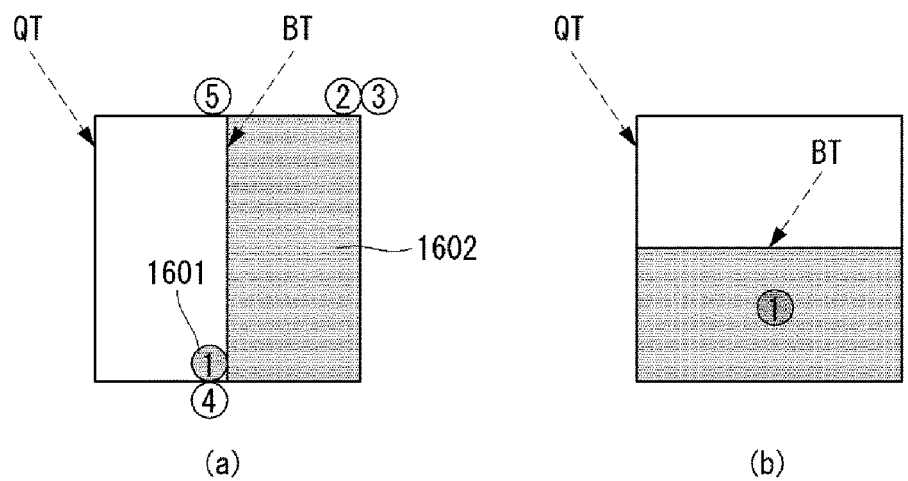
[Fig. 16]

[Fig. 17]
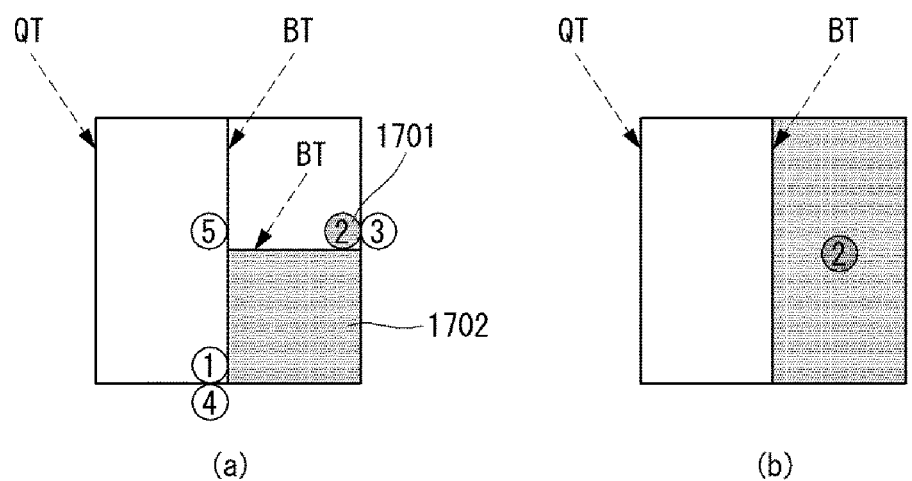

[Fig. 18]
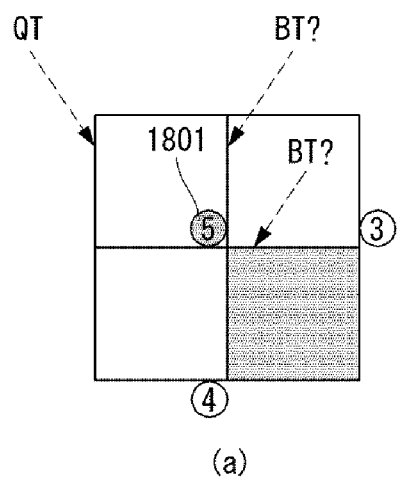
(a)
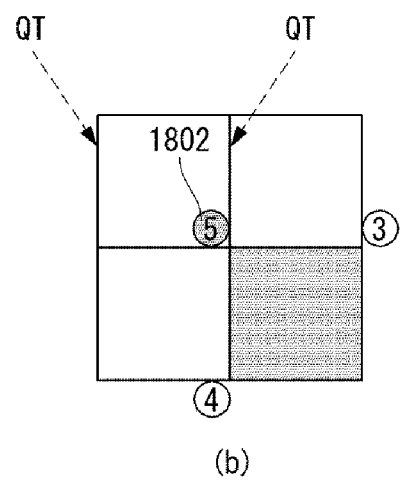
(b)

[Fig. 19]
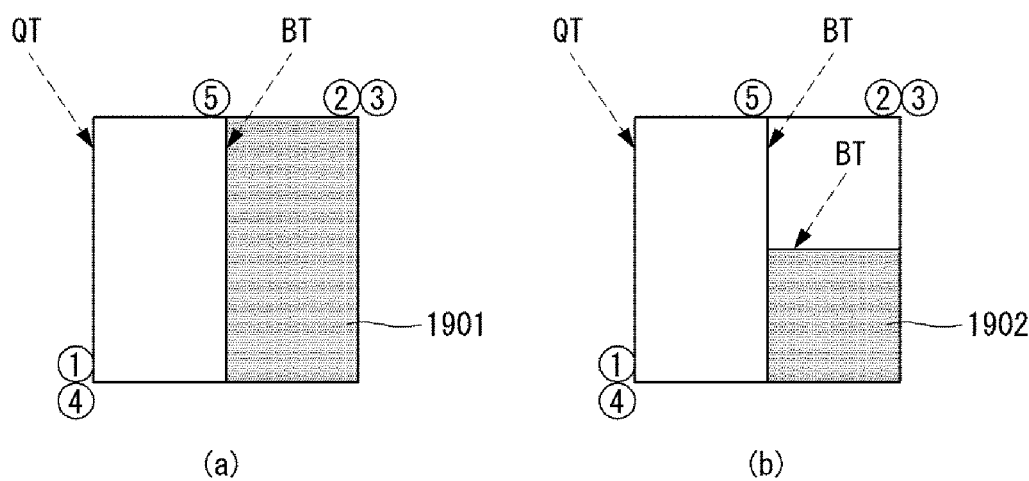

【Fig. 20】
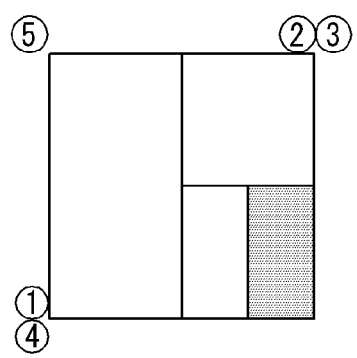
(a)
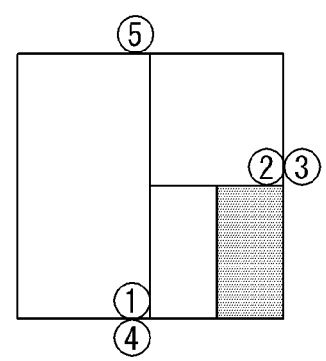
(b)

[Fig. 21]
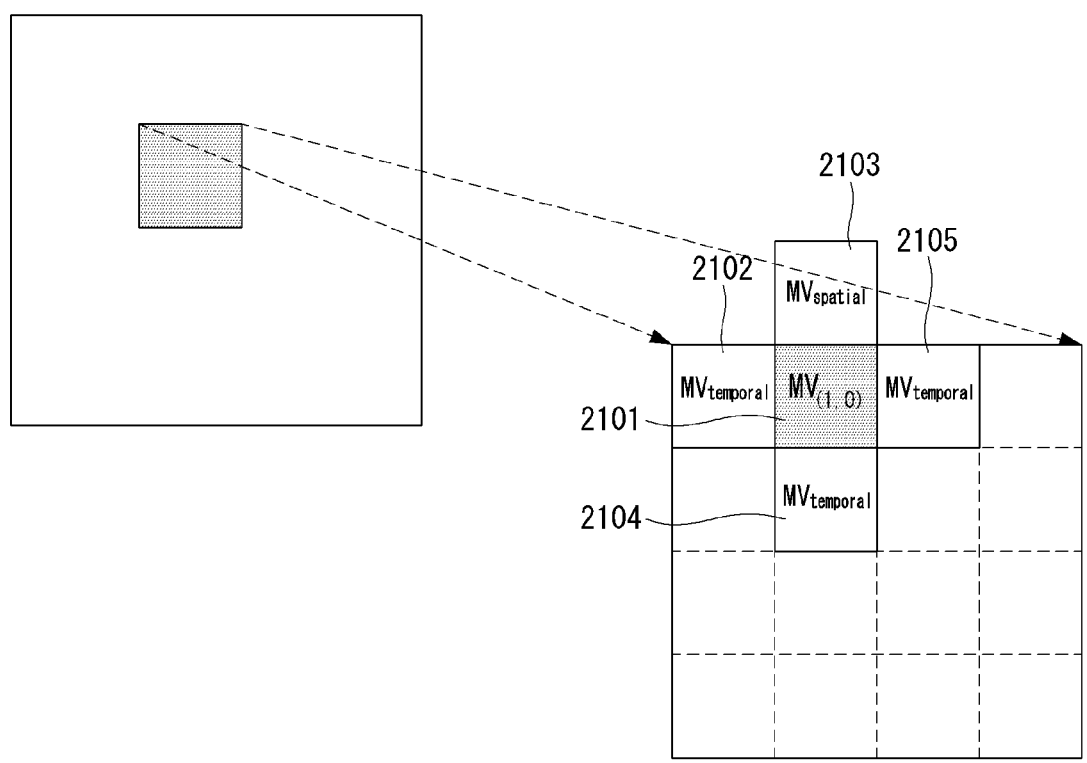

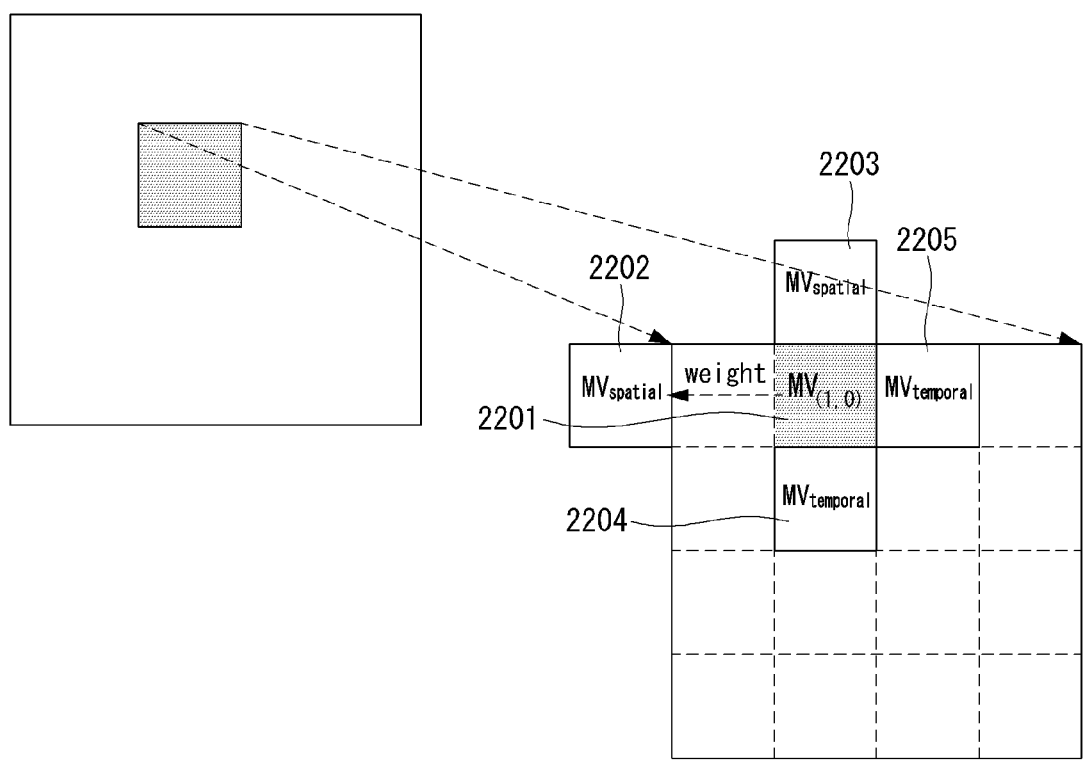
[Fig. 22]

[Fig. 23]
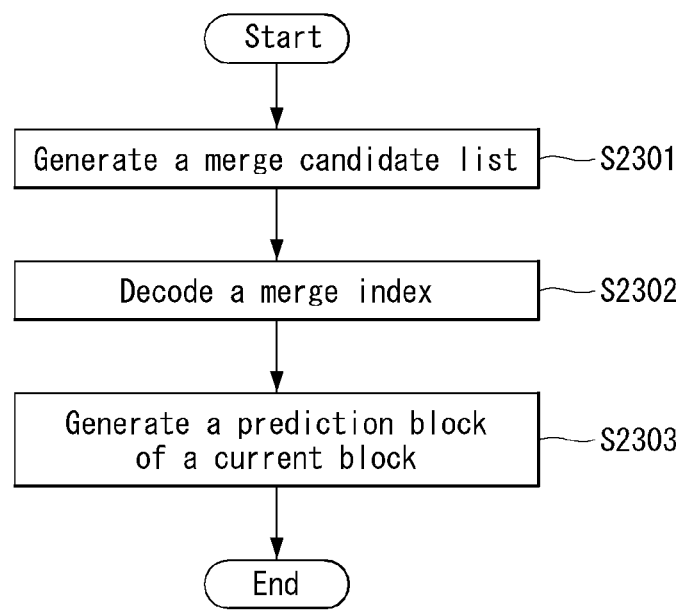

【Fig. 24】
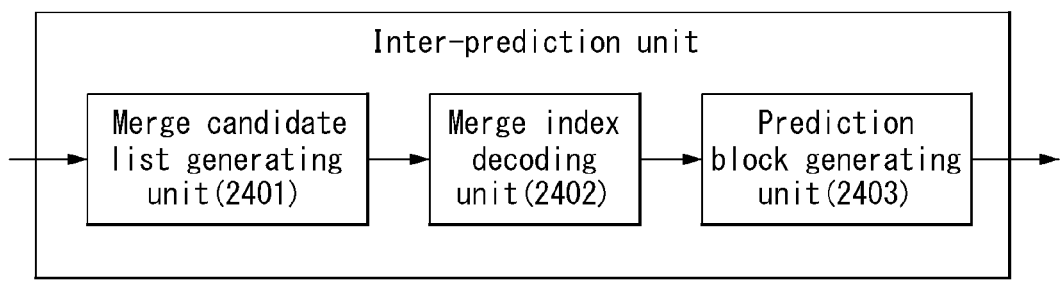

METHOD FOR PROCESSING VIDEO ON BASIS OF INTER PREDICTION MODE AND APPARATUS THEREFOR

CROSS-REFERENCE TO RELATED APPLICATIONS

This application is the National Stage filing under 35 U.S.C. 371 of International Application No. PCT/KR2017/010964, filed on Sep. 29, 2017, which claims the benefit of U.S. Provisional Applications No. 62/404,774, filed on Oct. 6, 2016, the contents of which are all hereby incorporated by reference herein in their entirety.

TECHNICAL FIELD

The present invention relates to a method of processing a still image or a moving image and, more particularly, to a method of encoding/decoding a still image or a moving image based on an inter-prediction mode and an apparatus supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

An object of the present invention is to propose a method for determining a merge candidate by taking into account similarity of motion information of neighboring blocks split into a binary tree structure in inter-prediction (inter-frame prediction).

Also, an object of the present invention is to propose a method for using blocks adjacent to the blocks split into a quad tree structure from blocks split into a binary tree structure as merge candidates.

Technical objects to be achieved in the present invention are not limited to the aforementioned technical objects, and other technical objects not described above may be evidently understood by a person having ordinary skill in the art to which the present invention pertains from the following description.

Technical Solution

According to one aspect of the present invention, an inter prediction mode-based image processing method comprises generating a merge candidate list by using spatial merge candidates and temporal merge candidates of a current block; decoding a merge index indicating a specific merge candidate within the merge candidate list; and generating a prediction block of the current block by using motion information of a merge candidate indicated by the merge index, wherein, if the current block is a block split into a binary tree structure from a quad-tree block representing a leaf node block of a quad-tree structure, the spatial merge candidate is determined as a block adjacent to the quad-tree block boundary.

Preferably, the spatial merge candidate may be determined as at least one of a block adjacent to the lower-left boundary, a block adjacent to the upper-left boundary, a block adjacent to the upper-right boundary, a block adjacent to the upper boundary, or a block adjacent to the left boundary of the quad-tree block.

Preferably, the block adjacent to the upper boundary may be a block comprising pixels adjacent to the pixels adjacent to the upper-left boundary of the current block in the orthogonal direction or a block comprising pixels adjacent to upper-right pixels of the current block in the orthogonal direction.

Preferably, the block adjacent to the left boundary may be a block comprising pixels adjacent to the lower-left pixels of the current block in the horizontal direction.

Preferably, the generating a merge candidate list may comprise adding a first enhanced temporal merge candidate representing a block indicated by motion information of the spatial merge candidate within a temporal candidate picture to the merge candidate list, and if the merge index indicates the first enhanced temporal merge candidate, a prediction block of the current block may be generated by using motion information of the first enhanced temporal merge candidate as a sub-block unit.

Preferably, the generating a merge candidate list may comprise adding a second enhanced temporal merge candidate to the merge candidate list, and motion information of the second enhanced temporal merge candidate may be determined in sub-block units by using motion information of a block adjacent to the boundary of the current block within a current picture and motion information of a collocated block of the current block within a temporal candidate picture.

Preferably, motion information of a current sub-block of the current block may be determined by using motion information of blocks adjacent to the current sub-block in the horizontal and vertical directions among blocks adjacent to the boundaries of the current block; and motion information of blocks in the lower and right side of the current sub-block within the collocated block.

Preferably, a weight may be assigned to the motion information of a block adjacent to the current sub-block in the horizontal or vertical direction based on a distance to the current sub-block.

Preferably, if the current sub-block is not adjacent to the vertical boundary of the current block, motion information of the current sub-block may be determined by using motion information of blocks adjacent to the current sub-block in the horizontal direction among blocks adjacent to the boundary of the current block; and motion information of blocks in the upper, lower, and right side of the current sub-block within the collocated block.

Preferably, if the current sub-block is not adjacent to the horizontal boundary of the current block, motion information of the current sub-block may be determined by using motion information of blocks adjacent to the current sub-block in the vertical direction among blocks adjacent to the boundary of the current block; and motion information of blocks in the left, lower, and right side of the current sub-block within the collocated block.

According to another aspect of the present invention, an inter prediction mode-based image processing apparatus comprises a merge candidate list generating unit generating a merge candidate list by using spatial merge candidates and temporal merge candidates of a current block; a merge index decoding unit decoding a merge index indicating a specific merge candidate within the merge candidate list; and a prediction block generating unit generating a prediction block of the current block by using motion information of a merge candidate indicated by the merge index, wherein, if the current block is a block split into a binary tree structure from a quad-tree block representing a leaf node block of a quad-tree structure, the spatial merge candidate is determined as a block adjacent to the quad-tree block boundary.

Advantageous Effects

According to an embodiment of the present invention, a merge candidate list is generated by using merge candidates having a relatively higher selection probability according to a block split structure, and thereby prediction performance and image compression efficiency is improved.

Also, according to an embodiment of the present invention, by using blocks adjacent to the blocks split into a quad tree structure from blocks split into a binary tree structure, parallel implementation may be performed in block units split into a quad tree structure.

Technical effects which may be obtained in the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 is illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 is an embodiment to which the present invention may be applied and is a diagram illustrating the direction of inter-prediction.

FIG. 6 is an embodiment to which the present invention may be applied and illustrates integers for ¼ sample interpolation and a fraction sample locations.

FIG. 7 is an embodiment to which the present invention may be applied and illustrates the location of a spatial candidate.

FIG. 8 is an embodiment to which the present invention is applied and is a diagram illustrating an inter-prediction method.

FIG. 9 is an embodiment to which the present invention may be applied and is a diagram illustrating a motion compensation process.

FIG. 10 illustrates a position of a spatial merge candidate, as an embodiment to which the present invention is applied.

FIG. 11 illustrates a position of a temporal merge candidate, as an embodiment to which the present invention is applied.

FIG. 12 illustrates a method for deriving motion information by using an advanced temporal motion vector predictor, as an embodiment to which the present invention is applied.

FIGS. 13 and 14 illustrates a method for deriving motion information by using advanced temporal motion vector predictor-extension, as an embodiment to which the present invention is applied.

FIGS. 15 to 18 illustrate a problem occurred when a merge candidate is composed by using a position of an existing spatial merge candidate in the QTBT structure.

FIG. 19 illustrates a method for composing a spatial merge candidate by using blocks adjacent to the boundary of a leaf node block of a quad tree, as an embodiment to which the present invention is applied.

FIG. 20 illustrates a case where a quad tree block is split into a binary tree structure of depth 3.

FIG. 21 illustrates a method for deriving motion information by using advanced temporal motion vector predictor-extension, as an embodiment to which the present invention is applied.

FIG. 22 illustrates a method for deriving motion information by using advanced temporal motion vector predictor-extension, as an embodiment to which the present invention is applied.

FIG. 23 illustrates an inter prediction method according to one embodiment of the present invention.

FIG. 24 illustrates in more detail an inter-prediction unit according to one embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in this specification, a "processing unit" means a unit in which an encoding/decoding processing process, such as prediction, transform and/or quantization, is performed. Hereinafter, for convenience of description, a processing unit may also be called "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PU) or transform block (TB) for a chroma component. Also, the present invention is not limited to this, and the processing unit may be interpreted to include a unit for the luma component and a unit for the chroma component.

Furthermore, a processing unit is not essentially limited to a square block and may be constructed in a polygon form having three or more vertices.

FIG. 1 illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequantization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy.

In particular, an inter-prediction unit 181 according to the present invention may use backward motion information for inter-prediction (or inter-picture prediction). Detailed descriptions thereof will be described later.

In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Next, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

In particular, an inter-prediction unit 261 according to the present invention may use backward motion information for inter-prediction (or inter-picture prediction). Detailed descriptions thereof will be described later.

Processing Unit Split Structure

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(b), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and I have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Prediction

In order to reconstruct a current processing unit on which decoding is performed, the decoded part of a current picture or other pictures including the current processing unit may be used.

A picture (slice) using only a current picture for reconstruction, that is, on which only intra-prediction is performed, may be called an intra-picture or I picture (slice), a picture (slice) using a maximum of one motion vector and reference index in order to predict each unit may be called a predictive picture or P picture (slice), and a picture (slice) using a maximum of two motion vector and reference indices may be called a bi-predictive picture or B a picture (slice).

Intra-prediction means a prediction method of deriving a current processing block from the data element (e.g., a sample value) of the same decoded picture (or slice). That is, intra-prediction means a method of predicting the pixel value of a current processing block with reference to reconstructed regions within a current picture.

Hereinafter, inter-prediction is described in more detail.

Inter-Prediction (or Inter-Frame Prediction)

Inter-prediction means a prediction method of deriving a current processing block based on the data element (e.g., sample value or motion vector) of a picture other than a current picture. That is, inter-prediction means a method of predicting the pixel value of a current processing block with reference to reconstructed regions within another reconstructed picture other than a current picture.

Inter-prediction (or inter-picture prediction) is a technology for removing redundancy present between pictures and is chiefly performed through motion estimation and motion compensation.

FIG. 5 is an embodiment to which the present invention may be applied and is a diagram illustrating the direction of inter-prediction.

Referring to FIG. 5, inter-prediction may be divided into uni-direction prediction in which only one past picture or future picture is used as a reference picture on a time axis with respect to a single block and bi-directional prediction in which both the past and future pictures are referred at the same time.

Furthermore, the uni-direction prediction may be divided into forward direction prediction in which a single reference picture temporally displayed (or output) prior to a current picture is used and backward direction prediction in which a single reference picture temporally displayed (or output) after a current picture is used.

In the inter-prediction process (i.e., uni-direction or bi-directional prediction), a motion parameter (or information) used to specify which reference region (or reference block) is used in predicting a current block includes an inter-prediction mode (in this case, the inter-prediction mode may indicate a reference direction (i.e., uni-direction or bidirectional) and a reference list (i.e., L0, L1 or bidirectional)), a reference index (or reference picture index or reference list index), and motion vector information. The motion vector information may include a motion vector, motion vector prediction (MVP) or a motion vector difference (MVD). The motion vector difference means a difference between a motion vector and a motion vector predictor.

In the uni-direction prediction, a motion parameter for one-side direction is used. That is, one motion parameter may be necessary to specify a reference region (or reference block).

In the bi-directional prediction, a motion parameter for both directions is used. In the bi-directional prediction method, a maximum of two reference regions may be used. The two reference regions may be present in the same reference picture or may be present in different pictures. That is, in the bi-directional prediction method, a maximum of two motion parameters may be used. Two motion vectors may have the same reference picture index or may have different reference picture indices. In this case, the reference pictures may be displayed temporally prior to a current picture or may be displayed (or output) temporally after a current picture.

The encoder performs motion estimation in which a reference region most similar to a current processing block is searched for in reference pictures in an inter-prediction process. Furthermore, the encoder may provide the decoder with a motion parameter for a reference region.

The encoder/decoder may obtain the reference region of a current processing block using a motion parameter. The reference region is present in a reference picture having a reference index. Furthermore, the pixel value or interpolated value of a reference region specified by a motion vector may be used as the predictor of a current processing block. That is, motion compensation in which an image of a current processing block is predicted from a previously decoded picture is performed using motion information.

In order to reduce the transfer rate related to motion vector information, a method of obtaining a motion vector predictor (mvd) using motion information of previously decoded blocks and transmitting only the corresponding difference (mvd) may be used. That is, the decoder calculates the motion vector predictor of a current processing block using motion information of other decoded blocks and obtains a motion vector value for the current processing block using a difference from the encoder. In obtaining the motion vector predictor, the decoder may obtain various motion vector candidate values using motion information of other already decoded blocks, and may obtain one of the various motion vector candidate values as a motion vector predictor.

Reference Picture Set and Reference Picture List

In order to manage multiple reference pictures, a set of previously decoded pictures are stored in the decoded picture buffer (DPB) for the decoding of the remaining pictures.

A reconstructed picture that belongs to reconstructed pictures stored in the DPB and that is used for inter-prediction is called a reference picture. In other words, a reference picture means a picture including a sample that may be used for inter-prediction in the decoding process of a next picture in a decoding sequence.

A reference picture set (RPS) means a set of reference pictures associated with a picture, and includes all of previously associated pictures in the decoding sequence. A reference picture set may be used for the inter-prediction of an associated picture or a picture following a picture in the decoding sequence. That is, reference pictures retained in the decoded picture buffer (DPB) may be called a reference picture set. The encoder may provide the decoder with a sequence parameter set (SPS) (i.e., a syntax structure having a syntax element) or reference picture set information in each slice header.

A reference picture list means a list of reference pictures used for the inter-prediction of a P picture (or slice) or a B picture (or slice). In this case, the reference picture list may be divided into two reference pictures lists, which may be called a reference picture list 0 (or L0) and a reference picture list 1 (or L1). Furthermore, a reference picture belonging to the reference picture list 0 may be called a reference picture 0 (or L0 reference picture), and a reference picture belonging to the reference picture list 1 may be called a reference picture 1 (or L1 reference picture).

In the decoding process of the P picture (or slice), one reference picture list (i.e., the reference picture list 0). In the decoding process of the B picture (or slice), two reference picture lists (i.e., the reference picture list 0 and the reference picture list 1) may be used. Information for distinguishing between such reference picture lists for each reference picture may be provided to the decoder through reference picture set information. The decoder adds a reference picture to the reference picture list 0 or the reference picture list 1 based on reference picture set information.

In order to identify any one specific reference picture within a reference picture list, a reference picture index (or reference index) is used.

Fractional Sample Interpolation

A sample of a prediction block for an inter-predicted current processing block is obtained from the sample value of a corresponding reference region within a reference picture identified by a reference picture index. In this case, a corresponding reference region within a reference picture indicates the region of a location indicated by the horizontal component and vertical component of a motion vector. Fractional sample interpolation is used to generate a prediction sample for non-integer sample coordinates except a case where a motion vector has an integer value. For example, a motion vector of ¼ scale of the distance between samples may be supported.

In the case of HEVC, fractional sample interpolation of a luma component applies an 8 tab filter in the traverse direction and longitudinal direction. Furthermore, the fractional sample interpolation of a chroma component applies a 4 tab filter in the traverse direction and the longitudinal direction.

FIG. 6 is an embodiment to which the present invention may be applied and illustrates integers for ¼ sample interpolation and a fraction sample locations.

Referring to FIG. 6, a shadow block in which an upper-case letter (A_i,j) is written indicates an integer sample location, and a block not having a shadow in which a lower-case letter (x_i,j) is written indicates a fraction sample location.

A fraction sample is generated by applying an interpolation filter to an integer sample value in the horizontal direction and the vertical direction. For example, in the case of the horizontal direction, the 8 tab filter may be applied to four integer sample values on the left side and four integer sample values on the right side based on a fraction sample to be generated.

Inter-Prediction Mode

In HEVC, in order to reduce the amount of motion information, a merge mode and advanced motion vector prediction (AMVP) may be used.

1) Merge Mode

The merge mode means a method of deriving a motion parameter (or information) from a spatially or temporally neighbor block.

In the merge mode, a set of available candidates includes spatially neighboring candidates, temporal candidates and generated candidates.

FIG. 7 is an embodiment to which the present invention may be applied and illustrates the location of a spatial candidate.

Referring to FIG. 7(a), whether each spatial candidate block is available depending on the sequence of {A1, B1, B0, A0, B2} is determined. In this case, if a candidate block is not encoded in the intra-prediction mode and motion information is present or if a candidate block is located out of a current picture (or slice), the corresponding candidate block cannot be used.

After the validity of a spatial candidate is determined, a spatial merge candidate may be configured by excluding an unnecessary candidate block from the candidate block of a current processing block. For example, if the candidate block of a current prediction block is a first prediction block within the same coding block, candidate blocks having the same motion information other than a corresponding candidate block may be excluded.

When the spatial merge candidate configuration is completed, a temporal merge candidate configuration process is performed in order of {T0, T1}.

In a temporal candidate configuration, if the right bottom block T0 of a collocated block of a reference picture is available, the corresponding block is configured as a temporal merge candidate. The collocated block means a block present in a location corresponding to a current processing block in a selected reference picture. In contrast, if not, a block T1 located at the center of the collocated block is configured as a temporal merge candidate.

A maximum number of merge candidates may be specified in a slice header. If the number of merge candidates is greater than the maximum number, a spatial candidate and temporal candidate having a smaller number than the maximum number are maintained. If not, the number of additional merge candidates (i.e., combined bi-predictive merging candidates) is generated by combining candidates added so far until the number of candidates becomes the maximum number.

The encoder configures a merge candidate list using the above method, and signals candidate block information, selected in a merge candidate list by performing motion estimation, to the decoder as a merge index (e.g., merge_idx [x0][y0]'). FIG. 7(b) illustrates a case where a B1 block has been selected from the merge candidate list. In this case, an "index 1 (Index 1)" may be signaled to the decoder as a merge index.

The decoder configures a merge candidate list like the encoder, and derives motion information about a current prediction block from motion information of a candidate block corresponding to a merge index from the encoder in the merge candidate list. Furthermore, the decoder generates a prediction block for a current processing block based on the derived motion information (i.e., motion compensation).

2) Advanced Motion Vector Prediction (AMVP) Mode

The AMVP mode means a method of deriving a motion vector prediction value from a neighbor block. Accordingly, a horizontal and vertical motion vector difference (MVD), a reference index and an inter-prediction mode are signaled to the decoder. Horizontal and vertical motion vector values are calculated using the derived motion vector prediction value and a motion vector difference (MVDP) provided by the encoder.

That is, the encoder configures a motion vector predictor candidate list, and signals a motion reference flag (i.e., candidate block information) (e.g., mvp_IX_flag[x0][y0]'), selected in motion vector predictor candidate list by performing motion estimation, to the decoder. The decoder configures a motion vector predictor candidate list like the encoder, and derives the motion vector predictor of a current processing block using motion information of a candidate block indicated by a motion reference flag received from the encoder in the motion vector predictor candidate list. Furthermore, the decoder obtains a motion vector value for the current processing block using the derived motion vector predictor and a motion vector difference transmitted by the encoder. Furthermore, the decoder generates a prediction block for the current processing block based on the derived motion information (i.e., motion compensation).

In the case of the AMVP mode, two spatial motion candidates of the five available candidates in FIG. 7 are selected. The first spatial motion candidate is selected from a {A0, A1} set located on the left side, and the second spatial motion candidate is selected from a {B0, B1, B2} set located at the top. In this case, if the reference index of a neighbor candidate block is not the same as a current prediction block, a motion vector is scaled.

If the number of candidates selected as a result of search for spatial motion candidates is 2, a candidate configuration is terminated. If the number of selected candidates is less than 2, a temporal motion candidate is added.

FIG. 8 is an embodiment to which the present invention is applied and is a diagram illustrating an inter-prediction method.

Referring to FIG. 8, the decoder (in particular, the inter-prediction unit 261 of the decoder in FIG. 2) decodes a motion parameter for a processing block (e.g., a prediction unit) (S801).

For example, if the merge mode has been applied to the processing block, the decoder may decode a merge index signaled by the encoder. Furthermore, the motion parameter of the current processing block may be derived from the motion parameter of a candidate block indicated by the merge index.

Furthermore, if the AMVP mode has been applied to the processing block, the decoder may decode a horizontal and vertical motion vector difference (MVD), a reference index and an inter-prediction mode signaled by the encoder. Furthermore, the decoder may derive a motion vector predictor from the motion parameter of a candidate block indicated by a motion reference flag, and may derive the motion vector value of a current processing block using the motion vector predictor and the received motion vector difference.

The decoder performs motion compensation on a prediction unit using the decoded motion parameter (or information) (S802).

That is, the encoder/decoder perform motion compensation in which an image of a current unit is predicted from a previously decoded picture using the decoded motion parameter.

FIG. 9 is an embodiment to which the present invention may be applied and is a diagram illustrating a motion compensation process.

FIG. 9 illustrates a case where a motion parameter for a current block to be encoded in a current picture is uni-direction prediction, a second picture within LIST0, LIST0, and a motion vector (−a, b).

In this case, as in FIG. 9, the current block is predicted using the values (i.e., the sample values of a reference block) of a location (−a, b) spaced apart from the current block in the second picture of LIST0.

In the case of bi-directional prediction, another reference list (e.g., LIST1), a reference index and a motion vector difference are transmitted. The decoder derives two reference blocks and predicts a current block value based on the two reference blocks.

Embodiment 1

In one embodiment of the present invention, proposed is an inter-prediction method using a merge mode when block division is performed in a quad tree structure.

When a block is split in a quad-tree structure, both of the encoder and decoder may generate (or compose) a merge candidate list in the following order until the maximum number of merge candidates is satisfied.

1) Composition of spatial merge candidates
2) Composition of temporal merge candidates
3) Composition of combined merge candidates
4) Composition of zero motion vector candidates Here, the position of a spatial merge candidate and position of a temporal merge candidate will be described with reference to the following figure.

FIG. 10 illustrates a position of a spatial merge candidate, as an embodiment to which the present invention is applied.

Referring to FIG. 10(a), if a current block 1001 is a 2N×2N block, the encoder/decoder may search motion information of neighboring blocks of the current block 1001 in the order of 1(①), 2(②), 3(③), 4(④), 5(⑤) and use available (or valid) motion information as a merge candidate.

Referring to FIGS. 10(b) and (c), if the current block 1002, 1003 is a non-square block such as 2N×N, nL×2N, nR×2N, N×2N, or 2N×nU block, the encoder/decoder may search for motion information of neighboring blocks of the current block 1002, 1003 in the order of 1(①), 2(②), 3(③), 4(④) and use available (or valid) motion information as a merge candidate.

FIG. 11 illustrates a position of a temporal merge candidate, as an embodiment to which the present invention is applied.

Referring to FIG. 11, the encoder/decoder may use a lower-right block or central block of a collocated block 1104 at the corresponding position of the current block 1103 within a temporal candidate picture 1102 as a temporal merge candidate. In other words, the motion information of a block located in the lower-right side of the collocated block 1104 is considered first, and if no motion information is observed at the corresponding position, the encoder/decoder may use the motion information of a block located at the center of the collocated block 1104 as the motion information of a merge candidate.

A merge candidate selection method which takes into account temporal similarity, namely whether to use a temporal merge candidate may be determined at a slice header. If a temporal merge candidate is used, the encoder may transmit a reference direction of a temporal candidate picture and reference picture index used for determining a temporal merge candidate to the decoder in slice units. In this case, the encoder/decoder may compose a temporal merge candidate by referencing the same picture within all of the slices.

The maximum number of merge candidates may be specified by a slice header. If the maximum number of merge candidates is not transmitted from the slice header, the encoder/decoder may construct a list by using five merge candidates. At this time, the encoder/decoder may generate a merge candidate list by using up to four spatial merge candidates and one temporal merge candidate.

If the number of merge candidates is larger than the maximum number, smaller than the maximum number of spatial and temporal candidates are maintained. Otherwise, until the number of merge candidates reaches the maximum number, the encoder/decoder may combine candidates added to the merge candidate list up to present to generate combined merge candidates (namely combined bi-predictive merging candidates). If the maximum number of merge candidates is not satisfied only by the merge candidates which take into account spatial and temporal similarities, the encoder/decoder may select a zero motion vector as a merge candidate.

Embodiment 2

In one embodiment of the present invention, an inter-prediction method using a merge mode when a block is split in a Quadtree plus Binarytree (QTBT) structure is proposed. QTBT refers to a split structure of a coding block where a quadtree structure and binarytree structure is combined. More specifically, in the QTBT structure, an image is coded in CTU units, where a CTU is first split in a quadtree form, and a leaf node of a quadtree is additionally split in a binarytree form.

In particular, in the present embodiment, to compose a merge candidate list, the encoder/decoder may apply Advanced Temporal Motion Vector Predictor (ATMVP) and Advanced Temporal Motion Vector Predictor-extension (ATMVP-ext) in addition to the method of embodiment 1 described above, which will be described in detail later.

When a block is split in the QTBT structure, both of the encoder/decoder may generate (or compose) a merge candidate list by using a spatial merge candidate, temporal merge candidate, ATMVP, ATMVP-ext, combined merge candidate and/or zero motion vector candidate.

In one embodiment, the encoder/decoder may generate (or compose) a merge candidate list in the following order until the number of merge candidates reaches the maximum number.
  1) Composition of spatial merge candidate
  2) Composition of ATMVP
  3) Composition of ATMVP-ext
  4) Addition of spatial merge candidate
  5) Composition of temporal merge candidate
  6) Composition of combined merge candidate
  7) Composition of zero motion vector candidate At this time, for example, the encoder/decoder may search the blocks at positions 1(①), 2(②), 3(③), 4(④) described in FIG. 10 for valid motion information, determine a spatial merge candidate, and then compose ATMVP and ATMVP-ext. Afterwards, the encoder/decoder may add a spatial merge candidate by using the motion information at the position 5(⑤) described in FIG. 10.

The maximum number of merge candidates may be specified by a slice header. If the maximum number of merge candidates is not transmitted from the slice header, the encoder/decoder may construct a list by using a predetermined number of merge candidates. Preferably, the predetermined number may be one from 5 to 7.

And the encoder may signal to the decoder through the high-level syntax about whether to use (or apply) ATMVP and/or ATMVP-ext. For example, the encoder may signal to the decoder about whether to use ATMVP and/or ATMVP-ext in sequence, picture, or slice units. When ATMVP and ATMVP-ext is used, the maximum number of merge candidates may be increased by 1 according to whether ATMVP or ATMVP-ext is used. For example, when the maximum number of merge candidates is not transmitted, the decoder may set the maximum number of merge candidates to 5, and when both of ATMVP and ATMVP-ext are used, the maximum number of merge candidates may be increased to 7.

Similarly, when the maximum number of merge candidates is not transmitted, the decoder may set the maximum number of merge candidates to a predetermined number and compose a candidate irrespective of whether ATMVP or ATMVP-ext is used. For example, when the maximum number of merge candidates is not transmitted from the encoder, the decoder may set the maximum number of merge candidates to 7 and construct a merge candidate list by using a maximum of 7 merge candidates even under a condition that both of ATMVP and ATMVP-ext are not used.

ATMVP represents a block (or motion information of a block) specified by the motion information of a spatial merge candidate added to a merge candidate list within a temporal candidate picture (or reference picture). In the present invention, ATMVP may be referred to as a combined (or mixed) merge candidate, or the first advanced temporal merge candidate, which will be described with reference to the following figure.

FIG. 12 illustrates a method for deriving motion information by using an advanced temporal motion vector predictor, as an embodiment to which the present invention is applied.

Referring to FIG. 12, first, the encoder/decoder searches a candidate block 1203 of the current block 1202 within a temporal candidate picture by using the motion information 1201 of a spatial merge candidate which is added first to a merge candidate list.

In other words, the ATMVP candidate block 1202 may be specified by the motion information 1201 of the first spatial merge candidate of the merge candidate list.

And the motion information of the ATMVP candidate block 1202 may be derived in sub-block units. More specifically, when a merge index received from the encoder indicates the ATMVP candidate, a prediction block of the current block 1202 may be generated in sub-block units by using (or deriving) the motion information of the ATMVP candidate in sub-block units.

Next, ATMVP-ext represents a method which takes into account spatial and temporal similarity of motion information in sub-block units split from a current block. In the present invention, ATMVP-ext may be referred to as a combined (or mixed) merge candidate, or the second advanced temporal merge candidate, which will be descried with reference to the following figure.

FIGS. 13 and 14 illustrates a method for deriving motion information by using advanced temporal motion vector predictor-extension, as an embodiment to which the present invention is applied.

Referring to FIG. 13, when ATMVP-ext is applied, the encoder/decoder may partition the current block into a plurality of sub-blocks and determine (or derive) motion information at sub-block level. For example, the sub-block may be a block of 4×4 or 8×8 size.

To derive the motion vector (or motion information) of a current sub-block 1301, the encoder/decoder may use the motion information of sub-blocks 1302, 1303, 1304, 1305 adjacent to the current sub-block 1301. At this time, sub-blocks close to the left 1302 and upper side 1303 of the current block already correspond to a decoded area, the encoder/decoder may use the motion information of the corresponding area within the current picture. On the other hand, since those sub-blocks adjacent to the lower 1304 and right side 1304 of the current block belong to the area for which decoding has not been completed, the encoder/decoder may use the motion information at the corresponding position within the temporal candidate picture (or reference picture or collocated picture).

The encoder/decoder may derive an average value of a total of four pieces of motion information, namely, the motion information of two blocks 1302, 1303 spatially adjacent to the current sub-block 1301 and two blocks 1304, 1305 temporarily adjacent to the current sub-block 1301 as the motion information of the current sub-block 1301.

Referring to FIG. 14, when the current sub-block 1401 is not adjacent to the boundary of the current block, the encoder/decoder may use the motion information of neighboring sub-blocks by using the method described above but may remove dependency which may be occurred among sub-blocks by using the motion information in the area outside the boundary of the current block within the current picture.

In other words, when the current sub-block 1401 is adjacent to the upper boundary but is not adjacent to the left boundary, the encoder/decoder may use a block 1402 adjacent to the current sub-block 1401 in the horizontal direction among the blocks adjacent to the boundary of the current block within the current picture instead of a sub-block immediately to the left of the current sub-block 1401.

Embodiment 3

In one embodiment of the present invention, the encoder/decoder may use a block adjacent to the block split in a quad-tree structure from a block split in a binary tree structure as a merge candidate. In the present embodiment, the encoder/decoder may determine a merge candidate by taking into account the similarity of motion information of neighboring blocks according to partitioning in a binary tree structure.

As described above in the QTBT structure, after partitioning is performed first in a quad-tree structure, a leaf node block of a quad-tree (in what follows, it may be called a 'quad-tree block') is additionally split in a binary tree structure. At this time, similarity of motion information among blocks split in a binary tree form from a quad-tree block may be relatively low, which will be described with reference to the following figure.

FIGS. 15 to 18 illustrate a problem occurred when a merge candidate is composed by using a position of an existing spatial merge candidate in the QTBT structure.

FIG. 15 shows a position of a spatial merge candidate of a block split into a binary tree. FIG. 15(a) shows an example of a quad-tree block split in the vertical direction, and FIG. 15(b) shows an example where a quad-tree block is split in the vertical direction and again split in the horizontal direction.

Referring to FIG. 16, in the example of FIG. 15(a), if the first position 1601 is used as a spatial prediction candidate (namely spatial merge candidate) as shown in FIG. 16(a), since the current block 1602, which is the second binary tree block, uses the motion information which is the same as that of the first binary tree block, it is highly probable that the quad-tree block may be split as shown in FIG. 16(b) or binary tree partitioning is not performed.

Referring to FIG. 17, in the example of FIG. 15(b), if the second position 1701 is used as a spatial merge candidate of the current block 1702 as shown in FIG. 17(a), it is highly probable that the quad-tree block may be split as shown in FIG. 17(b).

Referring to FIG. 18, in the example of FIG. 15(b), it is assumed that the fifth position 1801, 1802 is used as a spatial merge candidate.

Composing a spatial merge candidate by checking the motion information up to the fifth position according to the composition order of spatial merge candidates may indicate that the motion information at the first position and the motion information at the second position are not the same as the motion information at the fifth position. When motion information as described above is employed, quad-tree blocks are efficient in terms of bit allocation of a split flag split in a quad-tree structure as shown in FIG. 18(b).

In other words, if motion information of a merge candidate at the fifth position 1801, 1802 in the example of FIG. 15(b), it is highly probable that the quad-tree block may be split as shown in FIG. 18(b).

As described above, similarity of motion information among blocks split in a binary tree form from a quad-tree block may be relatively low. Despite the fact above, if the same position as in the existing method is used, a spatial merge candidate having a low selection probability may be included in a merge candidate list, leading to degradation of compression performance.

Therefore, to solve the problem above, the present invention proposes a method for using a block adjacent to the boundary of a block split in a quad-tree structure from a block split in a binary tree structure as a merge candidate.

By generating a merge candidate list by using a merge candidate having a higher selection probability according to a block split structure, prediction performance and image compression efficiency may be improved.

Also, according to an embodiment of the present invention, by using blocks adjacent to the blocks split into a quad tree structure from blocks split into a binary tree structure, parallel implementation may be performed in block units split into a quad tree structure. In other words, according to the present embodiment, not only the problem may be solved, but also a merge process may be parallelized in quad-tree block units.

FIG. 19 illustrates a method for composing a spatial merge candidate by using blocks adjacent to the boundary of a leaf node block of a quad tree, as an embodiment to which the present invention is applied.

Referring to FIG. 19, if a current block 1901, 1902 is a block split in a binary tree structure from a quad-tree block representing a leaf node block of a quad-tree structure, a spatial merge candidate may be determined as a block adjacent to the boundary of the quad-tree block. More specifically, the spatial merge candidate may be a block at the position 1(①), 2(②), 3(③), 4(④), 5(⑤) (or a block including a pixel at the position 1(①), 2(②), 3(③), 4(④), 5(⑤)).

The encoder/decoder may search the motion information at the position 1(①), 2(②), 3(③), 4(④), 5(⑤) and compose a spatial merge candidate of the current block 1901, 1902.

When a spatial merge candidate at the position described above is used, compression performance may be improved compared with an existing method, and since dependency between binary tree blocks disappears during the process for deriving motion information of a binary tree block within a quad-tree block, parallelization may be performed in quad-tree block units.

Embodiment 4

In one embodiment of the present invention, when the encoder/decoder applies the ATMVP or ATMVP-ext method which derives motion information in sub-block units, a block adjacent to the boundary of a block split in a quad-tree structure from a block split in a binary tree structure may be used as a merge candidate.

The present embodiment proposes a method for composing a spatial merge candidate for deriving ATMVP suitable for the QTBT structure.

As described in the embodiment 3, during the process for composing a spatial merge candidate, a problem may occur that a selection probability of motion information of a neighboring candidate is decreased according to the QTBT block split structure. However, since ATMVP uses the motion information of a block specified within a temporal candidate picture by the motion information of a neighboring candidate, the problem as described in the embodiment 3 may not be occurred.

Therefore, the encoder/decoder may compose the ATMVP by using the motion information of a spatial candidate at the same position as in the existing method (namely the method described in FIG. 10). More specifically, if the current block is a block split according to a binary tree, the encoder/decoder may search the motion information of a spatial candidate at the position descried in FIG. 10; and may derive the motion information of a block within a temporal candidate picture, which is specified by the first valid (or available) motion information, in sub-block units and use the derived motion information as the motion information of the current block.

On the other hand, the encoder/decoder may compose the ATMVP by using motion information of a spatial candidate at the same position as described in FIG. 19 by taking into account the consistency with the method proposed in the embodiment 3 or reduction of complexity. More specifically, if the current block is a block split according to a binary tree, the encoder/decoder may search the motion information of a spatial candidate at the position descried in FIG. 19; and may derive the motion information of a block within a temporal candidate picture, which is specified by the first valid (or available) motion information, in sub-block units and use the derived motion information as the motion information of the current block.

FIG. 20 illustrates a method for composing a spatial merge candidate by using a block adjacent to the boundary of a leaf node block of a quad-tree, as an embodiment to which the present invention is applied.

FIG. 20 illustrates a case where a quad tree block is split into a binary tree structure of depth 3.

The encoder/decoder may compose a merge candidate list by using spatial merge candidates at the position shown in FIG. 20(*a*) (1(①), 2(②), 3(③), 4(④), 5(⑤)) for parallelization in quad-tree block units.

Also, the encoder/decoder may compose a merge candidate list by using spatial merge candidates at the position shown in FIG. 20(*b*) (1(①), 2(②), 3(③), 4(④), 5(⑤)) for parallelization of blocks at the same depth of a binary tree.

The encoder determines a unit based on which parallelization is performed and transmit a determined parallelization unit to the decoder through high-level syntax. For example, the encoder may signal the parallelization unit to the decoder in sequence, picture, or slice units. If the encoder transmits the parallelization unit, the decoder may use the spatial candidate positions shown in FIGS. 20(*a*) and (*b*) selectively.

Embodiment 5

In one embodiment of the present invention, a method for applying ATMVP-ext efficiently by taking into account the QTBT structure.

As described in the embodiment 2, the ATMVP-ext derives motion information in sub-block units. Since complexity in the QTBT structure is increased significantly according to the increase of variety of the block structure, parallelization emerges as an important issue, and a problem is occurred that according to the characteristics of a sub-block at the time of performing parallelization, reliability of motion information at neighboring candidate positions is degraded.

To solve the problem above, the present embodiment proposes a method for determining the position of a spatial or temporal candidate used in the ATMVP-ext according to the position of each sub-block within a current processing block.

FIG. 21 illustrates a method for deriving motion information by using advanced temporal motion vector predictor-extension, as an embodiment to which the present invention is applied.

Referring to FIG. 21, the encoder/decoder may determine ATMVP-ext motion information by using the motion information of a temporal candidate instead of a spatial candidate at the position not on the block boundary.

For example, if the current sub-block 2101 is not adjacent to the horizontal boundary of a current block, the motion information of the current sub-block 2101 may be determined by using the motion information of a block 2103 adjacent to the current sub-block 2101 in the horizontal direction and the motion information of a block at the left 2102, lower 2104, and right side 2105 position of the current sub-block 2102 within a collocated block of a temporal candidate picture.

FIG. 22 illustrates a method for deriving motion information by using advanced temporal motion vector predictor-extension, as an embodiment to which the present invention is applied.

Referring to FIG. 22, if the current sub-block 2201 is not adjacent to the left or upper boundary of a current block, a spatial candidate motion vector adjacent to the current block is used; however, if the motion vector 2202 of the corresponding spatial candidate becomes more distant from the current sub-block 2201, a weight which has a relatively small value may be applied. For example, the eight value may be smaller than 1.

Up to this point, a method for composing a candidate list in a merge mode has been mainly described; however, embodiments described above may also be applied to the Advanced Motion Vector Prediction (AMVP) mode. In other words, if the merge mode is not applied, the AMVP mode may be applied, and in this case, the decoder may generate an AMVP candidate list by applying the method described above and perform inter-prediction by using the motion vector difference value received from the encoder and reference picture index.

Also, the embodiments described above may be applied independently from each other, or a combination of one or more embodiments may be applied.

FIG. 23 illustrates an inter prediction method according to one embodiment of the present invention.

Referring to FIG. 23, for the sake of convenience, descriptions are given primarily to a decoder; however, an inter-prediction method according to the present embodiment may be applied to both of an encoder and decoder in the same way.

The decoder generates a merge candidate list by using a spatial merge candidate and temporal merge candidate of a current block S2301.

As described above, if the current block is a block split into a binary tree structure from a quad-tree block representing a leaf node block of a quad-tree structure, the spatial merge candidate is determined as a block adjacent to the quad-tree block boundary.

More specifically, the spatial merge candidate may be determined as at least one of a block adjacent to the lower-left boundary, a block adjacent to the upper-left boundary, a block adjacent to the upper-right boundary, a block adjacent to the upper boundary, or a block adjacent to the left boundary of the quad-tree block. Here, the block adjacent to the upper boundary may be a block comprising pixels adjacent to the pixels adjacent to the upper-left boundary of the current block in the orthogonal direction or a block comprising pixels adjacent to upper-right pixels of the current block in the orthogonal direction. The block adjacent to the left boundary may be a block comprising pixels adjacent to the lower-left pixels of the current block in the horizontal direction.

Also, as described above, the S2301 step may comprise adding a first enhanced temporal merge candidate (ATMVP) representing a block indicated by motion information of the spatial merge candidate within a temporal candidate picture to the merge candidate list.

If the merge index indicates the first enhanced temporal merge candidate, a prediction block of the current block may be generated by using motion information of the first enhanced temporal merge candidate as a sub-block unit.

Also, as described above, the S2301 step may comprise adding the second enhanced temporal merge candidate (AT-MVP-ext) to the merge candidate list. Here, the motion information of the second enhanced temporal merge candidate may be determined in sub-block units by using motion information of a block adjacent to the boundary of the current block within a current picture and motion information of a collocated block of the current block within a temporal candidate picture. And, the motion information of a current sub-block of the current block may be determined by using motion information of blocks adjacent to the current sub-block in the horizontal and vertical directions among blocks adjacent to the boundaries of the current block; and motion information of blocks in the lower and right side of the current sub-block within the collocated block.

As described with reference to FIG. 22, a weight may be assigned to the motion information of a block adjacent to the current sub-block in the horizontal or vertical direction based on a distance to the current sub-block.

As described with reference to FIG. 21, if the current sub-block is not adjacent to the vertical boundary of the current block, motion information of the current sub-block may be determined by using motion information of blocks adjacent to the current sub-block in the horizontal direction among blocks adjacent to the boundary of the current block; and motion information of blocks in the upper, lower, and right side of the current sub-block within the collocated block. And, if the current sub-block is not adjacent to the horizontal boundary of the current block, motion information of the current sub-block may be determined by using motion information of blocks adjacent to the current sub-block in the vertical direction among blocks adjacent to the boundary of the current block; and motion information of blocks in the left, lower, and right side of the current sub-block within the collocated block.

The decoder decodes (or extracts) a merge index indicating a specific merge candidate within a merge candidate list S2302.

The decoder generates a prediction block of the current block by using the motion information of a merge candidate indicated by the merge index S2303.

FIG. 24 illustrates in more detail an inter-prediction unit according to one embodiment of the present invention.

For the sake of convenience, FIG. 24 assumes the inter-prediction unit is composed of a single block; however, the inter-prediction unit may also be implemented in such a way to be included in the encoder and/or decoder.

Referring to FIG. 24, the inter-prediction unit implements the function, process and/or method proposed in FIGS. 5 to 23. More specifically, the inter-prediction unit may be composed of a merge candidate list composing unit 2401, merge index decoding unit 2402, and prediction block generating unit 2403.

The merge candidate list composing unit 2401 generates a merge candidate list by using a spatial merge candidate and temporal merge candidate of a current block.

As described above, if the current block is a block split into a binary tree structure from a quad-tree block representing a leaf node block of a quad-tree structure, the spatial merge candidate is determined as a block adjacent to the quad-tree block boundary.

More specifically, the spatial merge candidate may be determined as at least one of a block adjacent to the lower-left boundary, a block adjacent to the upper-left boundary, a block adjacent to the upper-right boundary, a block adjacent to the upper boundary, or a block adjacent to the left boundary of the quad-tree block. Here, the block adjacent to the upper boundary may be a block comprising pixels adjacent to the pixels adjacent to the upper-left boundary of the current block in the orthogonal direction or a block comprising pixels adjacent to upper-right pixels of the current block in the orthogonal direction. The block adjacent to the left boundary may be a block comprising pixels adjacent to the lower-left pixels of the current block in the horizontal direction.

Also, as described above, the merge candidate list composing unit 2401 may add the first advanced temporal merge candidate (ATMVP) which represents a block specified by the motion information of the spatial merge candidate within a temporal candidate picture to the merge candidate list.

If the merge index indicates the first advanced temporal merge candidate, a prediction block of the current block may be generated by using the motion information of the first advanced temporal merge candidate as a sub-block unit.

Also, as described above, the merge candidate list composing unit 2401 may add the second enhanced temporal merge candidate (ATMVP-ext) to the merge candidate list. Here, the motion information of the second enhanced temporal merge candidate may be determined in sub-block units by using motion information of a block adjacent to the boundary of the current block within a current picture and motion information of a collocated block of the current block within a temporal candidate picture. And, the motion information of a current sub-block of the current block may be determined by using motion information of blocks adjacent to the current sub-block in the horizontal and vertical directions among blocks adjacent to the boundaries of the current block; and motion information of blocks in the lower and right side of the current sub-block within the collocated block.

As described with reference to FIG. 22, a weight may be assigned to the motion information of a block adjacent to the current sub-block in the horizontal or vertical direction based on a distance to the current sub-block.

As described with reference to FIG. 21, if the current sub-block is not adjacent to the vertical boundary of the current block, motion information of the current sub-block may be determined by using motion information of blocks adjacent to the current sub-block in the horizontal direction among blocks adjacent to the boundary of the current block; and motion information of blocks in the upper, lower, and right side of the current sub-block within the collocated block. And, if the current sub-block is not adjacent to the horizontal boundary of the current block, motion information of the current sub-block may be determined by using motion information of blocks adjacent to the current sub-block in the vertical direction among blocks adjacent to the boundary of the current block; and motion information of blocks in the left, lower, and right side of the current sub-block within the collocated block.

The merge index decoding unit 2402 decoded (or extracts) a merge index indicating a specific merge candidate within a merge candidate list.

The prediction block generating unit 2403 generates a prediction block of the current block by using the motion information of a merge candidate indicated by the merge index.

The embodiments described above are combinations of constituting elements and features of the present invention in a predetermined form. Each individual element or feature has to be considered as optional except where otherwise explicitly indicated. Each individual element or feature may be implemented solely without being combined with other elements or features. Also, it is also possible to construct the embodiments of the present invention by combining a portion of the elements and/or features. A portion of a structure or feature of an embodiment may be included in another embodiment or may be replaced with the corresponding structure of feature of another embodiment. It should be clearly understood that the claims which are not explicitly cited within the technical scope of the present invention may be combined to form an embodiment or may be included in a new claim by an amendment after application.

The embodiments of the present invention may be implemented by various means such as hardware, firmware, software, or a combination thereof. In the case of hardware implementation, one embodiment of the present invention may be implemented by using one or more of ASICs (Application Specific Integrated Circuits), DPSs (Digital Signal Processors), DSPDs (Digital Signal Processing Devices), PLDs (Programmable Logic Devices), FPGAs (Field Programmable Gate Arrays), processors, controllers, micro-controllers, and micro-processors.

In the case of implementation by firmware or software, one embodiment of the present invention may be implemented in the form of modules, procedures, functions, and the like which perform the functions or operations described above. Software codes may be stored in the memory and activated by the processor. The memory may be located inside or outside of the processor and may exchange data with the processor by using various well-known means.

It is apparent for those skilled in the art that the present invention may be embodied in other specific forms without departing from the essential characteristics of the present invention. Therefore, the detailed descriptions above should be regarded as being illustrative rather than restrictive in every aspect. The technical scope of the present invention should be determined by a reasonable interpretation of the appended claims, and all of the modifications that fall within an equivalent scope of the present invention belong to the technical scope of the present invention.

INDUSTRIAL APPLICABILITY

The preferred embodiments of the present invention described above have been disclosed for the purpose of illustration. Therefore, it should be understood by those skilled in the art that the embodiments may be upgraded, modified, substituted, or extended to generate various other embodiments within the technical spirits and scope of the present invention disclosed by the appended claims.

The invention claimed is:

1. A method of processing an inter prediction mode-based image by an apparatus, comprising:
   generating a merge candidate list by using spatial merge candidates and temporal merge candidates of a current block with respect to motion information;
   decoding a merge index indicating a specific merge candidate within the merge candidate list; and
   generating a prediction block of the current block by using the motion information of a merge candidate indicated by the merge index,
   wherein generating the merge candidate list comprises determining, when the current block is a block split into a binary tree structure from a quad-tree block representing a leaf node block of a quad-tree structure and at least one of a left boundary and a top boundary of the current block does not share at least a part of one among boundaries of the quad-tree block, a block adjacent to a boundary of the quad-tree block as one of the spatial merge candidates.

2. The method of claim 1, wherein at least one of a block adjacent to a bottom left boundary, a block adjacent to a top left boundary, a block adjacent to a top right boundary, a block adjacent to a top boundary, or a block adjacent to a left boundary of the quad-tree block is determined as the spatial merge candidate.

3. The method of claim 2, wherein the block adjacent to the top boundary is a block comprising pixels adjacent, in a vertical direction, to pixels adjacent to a top left boundary of the current block or a block comprising pixels adjacent to top right pixels of the current block in the vertical direction.

4. The method of claim 2, wherein the block adjacent to the left boundary is a block comprising pixels adjacent to bottom left pixels of the current block in a horizontal direction.

5. The method of claim 1, wherein generating the merge candidate list comprises adding to the merge candidate list a first enhanced temporal merge candidate representing a block indicated by motion information of the spatial merge candidate within a temporal candidate picture, and wherein if the merge index indicates the first enhanced temporal merge candidate, a prediction block of the current block is generated by using motion information of the first enhanced temporal merge candidate in sub-block units.

6. The method of claim 1, wherein generating the merge candidate list comprises adding a second enhanced temporal merge candidate to the merge candidate list, and wherein motion information of the second enhanced temporal merge candidate is determined in sub-block units by using motion information of a block adjacent to a boundary of the current block within a current picture and motion information of a collocated block of the current block within a temporal candidate picture.

7. The method of claim 6, wherein motion information of a current sub-block of the current block is determined by using motion information of blocks adjacent to the current sub-block in horizontal and vertical directions among blocks adjacent to boundaries of the current block; and motion information of blocks in bottom and right sides of the current sub-block within the collocated block.

8. The method of claim 7, wherein a weight is assigned to the motion information of a block adjacent to the current sub-block in the horizontal or vertical direction based on a distance to the current sub-block.

9. The method of claim 6, wherein, if the current sub-block is not adjacent to a vertical boundary of the current block, motion information of the current sub-block is determined by using motion information of a block adjacent to the current sub-block in a horizontal direction among blocks adjacent to boundaries of the current block; and motion information of blocks in top, bottom, and right sides of the current sub-block within the collocated block.

10. The method of claim 6, wherein, if the current sub-block is not adjacent to a horizontal boundary of the current block, motion information of the current sub-block is determined by using motion information of a block adjacent to the current sub-block in a vertical direction among blocks adjacent to boundaries of the current block; and motion information of blocks in left, bottom, and right sides of the current sub-block within the collocated block.

11. An inter prediction mode-based image processing apparatus, comprising:

a merge candidate list generating unit to generate a merge candidate list by using spatial merge candidates and temporal merge candidates of a current block with respect to motion information;

a merge index decoding unit to decode a merge index indicating a specific merge candidate within the merge candidate list; and a prediction block generating unit to generate a prediction block of the current block by using the motion information of a merge candidate indicated by the merge index, wherein when the current block is a block split into a binary tree structure from a quad-tree block representing a leaf node block of a quad-tree structure and at least one of a left boundary and a top boundary of the current block does not share at least a part of one among boundaries of the quad-tree block, the merge candidate list generating unit is configured to determine a block adjacent to a boundary of the quad-tree block as one of the spatial merge candidates.

* * * * *